3,222,354
WATER-SOLUBLE REACTIVE AZO DYES
Guenter Lange, Ludwigshafen (Rhine), Germany, assignor to Badische Anilin- & Soda-Fabrik Aktiengesellschaft, Ludwigshafen (Rhine), Germany
No Drawing. Filed Mar. 15, 1963, Ser. No. 265,332
Claims priority, application Germany, Mar. 17, 1962, B 66,412
9 Claims. (Cl. 260—163)

This invention relates to new water-soluble reactive monoazo and disazo dyes which in the portion of the molecule corresponding to the diazo component contain an acylamino group whose acyl radical contains up to six carbon atoms and is unsaturated in $\alpha,\beta$-position or reacts like such a radical, and which in ortho-position to the acylamino group and in meta-position or para-position to the azo bridge contain a sulfonic acid group.

The dyes may be represented by the general formula:

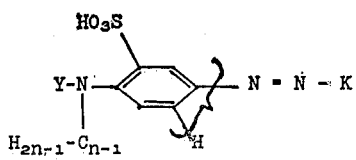

in which:

Y denotes a reactive acyl radical which contains up to six carbon atoms and which is unsaturated in $\alpha,\beta$-position or reacts under the conditions of dyeing and printing with the hydroxyl groups of fibrous material like such a radical, K denotes the radical of a coupling component, preferably of the naphthalene or pyrazolone series (the coupling component if desired containing an azo linkage) and $n$ denotes one of the whole numbers 1, 2 and 3.

Coupling components having one or more sulphonic acid radicals are preferred, but azo dyes not having water-solubilizing radicals in the coupling component are also excellent products.

The new azo dyes may be prepared by coupling diazonium compounds with coupling components in such a way that there is present in the molecule of the azo compound obtained at least one radical of the general formula:

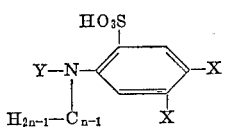

in which one X denotes a hydrogen atom and the other X denotes an azo bridge, $n$ denotes a whole number, preferably 1, and Y denotes a hydrogen atom or the acyl radical of an $\alpha,\beta$-unsaturated carboxylic acid having at the most six and preferably three to four carbon atoms, or an acyl radical which under dyeing conditions may be converted into an $\alpha,\beta$-unsaturated carboxylic acid radical having the said number of carbon atoms, Y, when it denotes hydrogen, then being replaced by an acyl radical of the said kind. The hydrogen ion in the HO$_3$S— group in the above formula may also be replaced by another inorganic or organic cation, for example by sodium or potassium. Those dyes are preferred in which the X in para-position to the Y—N— radical constitutes the azo bridge. The radical of acrylic acid is particularly suitable as the radical of an $\alpha,\beta$-unsaturated carboxylic acid. The acrylic acid radical may also contain for example halogen atoms or alkyl and/or carboxylic or carboxylic amide groups. The acyl radicals of the alkyl (preferably methyl and ethyl) and/or halogen substitution products of acrylic acid, such as $\alpha$-methyl- and/or $\beta$-methyl- and/or dimethylacrylic acid, $\alpha$-mono- and/or $\beta$-mono- and/or dichloroacrylic acid, and also maleic acid and the monochloromaleic and/or dichloromaleic acids, are therefore also suitable. The monochloromaleic acid radical is preferred. The $\alpha,\beta$-linkage may also be acetylenically unsaturated, as for example in propiolic acid, the radical of which is also particularly suitable.

Examples of acyl radicals which are convertible under dyeing conditions into the radical of an $\alpha,\beta$-unsaturated carboxylic acid are particularly the radicals of $\beta$-halopropionic acids or their substitution products and especially the $\beta$-chloropropionyl radical of which it is known that under conditions such as are usual in dyeing or printing with reactive dyes it is readily converted into the $\alpha,\beta$-unsaturated carboxylic acid radical. It may be generally stated, however, that reactive radicals which considerably increase the water-solubility of the finished dye are not preferred.

The radical $C_{n-1}H_{2n-1}$ is advantageously hydrogen ($n=1$), but may also be methyl ($n=2$) or ethyl ($n=3$). Values of $n$ which are higher than this do not offer any particular advantage over the said values within the scope of the present invention.

Anhydrides or acid halides may be used for the introduction of the acyl radicals Y into the diazo components.

In principle, all compounds capable of coupling may be used as coupling components for the new reactive azo dyes, particularly phenols, naphthols, naphtholsulfonic acids, aminonaphthols, aminonaphtholsulfonic acids, acylaminonaphthols whose acyl radical may be reactive, arylamino naphtholsulfonic acids, 5-pyrazolones and their sulfonic acids, and also hydroxyquinolines and azo compounds capable of coupling. If the coupling components in turn contain diazotizable amino groups or amino group derivatives convertible into the same, the dyes obtained may be reacted to form disazo dyes. Individual examples of coupling components which may be used in the process of this invention are given in the following examples. Coupling components which contain a sulfonic acid group are preferred.

The dyes thus obtained lend themselves admirably to the reactive dyeing, particularly by the so-called pad-batch process, of fibers and other high molecular weight compounds whose molecules have groups which under dyeing conditions can enter into chemical combination with the reactive radical. Examples of such groups are hydroxyl groups. Accordingly the following are examples of materials suitable for dyeing: cotton, rayon staple, viscose, wool, silk, leather, and skins. The new dyes are particularly suitable for printing. Dyes obtainable according to this invention are distinguished by brilliance of shade and very good wet and light fastness. In printing and pad-batch processes and in their solubility, the dyes according to this invention are superior to the prior art azo dyes derived from diazo components having the general formula:

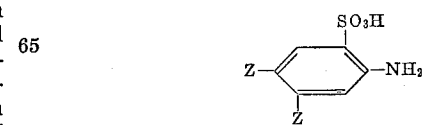

where one Z denotes a hydrogen atom and the other Z denotes an acyl radical attached via an amino bridge.

The prior art azo dyes derived from diazo components having the formula:

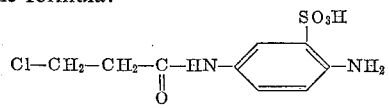

are also inferior in solubility, dyeing and printing to the new dyes obtainable according to this invention.

By reactive dyeing we mean dyeing and printing processes whose object is to cause a chemical combination of the reactive dye with fibers containing reactive groups or with other substances capable of reaction, under the influence of basic compounds, for example mild alkali, such as sodium hydrogen carbonate, or also of strong alkali such as sodium hydroxide in aqueous phase, at elevated temperature and/or with long storage of the dyed or printed material.

The invention is further illustrated by the following examples in which parts are by weight.

EXAMPLE 1

48.4 parts of 1-amino-4-acryloylaminobenzene-3-sulfonic acid is dissolved in 200 parts of water with the addition of 20 parts of caustic soda solution (10 moles/l.). 40 parts of a 5 M sodium nitrite solution is added to the neutral solution, 400 parts of ice introduced and diazotization effected by pouring in 50 parts of hydrochloric acid (10 moles/l.). The suspension of the diazonium salt is then allowed to flow into a coupling solution prepared from 200 parts of water, 50.6 parts of sodium 1-hydroxynaphthalene-4-sulfonate, 25 parts of caustic soda solution (10 moles/l.) and 40 parts of sodium carbonate solution (1.25 moles/l.). Coupling is soon ended. The deposited dye is filtered off with suction and washed with about 100 parts of a 10% sodium chloride solution. The product is dried at about 70° C. and a dark red powder is obtained which dyes cotton, rayon staple and viscose very fast red shades of great tinctorial strength.

EXAMPLE 2

12.1 parts of 1-amino-3-acryloylaminobenzene-4-sulfonic acid is dissolved in 50 parts of water with an addition of 5 parts of caustic soda solution. 10 parts of a 5 M sodium nitrite solution and 50 parts of ice are introduced into the neutral solution. 13 parts of hydrochloric acid (10 moles/l.) is then poured in and the whole stirred for about another hour. The hydrochloric acid suspension of the diazonium salt is then added to a coupling solution prepared from 50 parts of water, 15 parts of 1-(2-chloro-5-sulfo)-phenyl-3-methylpyrazolone-(5), 11 parts of caustic soda solution (10 moles/l.) and 40 parts of sodium carbonate solution (1.25 moles/l.). The coupling is rapidly ended and then the yellow dye formed is salted out by adding 60 parts of potassium chloride, the whole stirred for about ninety minutes and the dye then filtered off with suction and dried at 60° C. under subatmospheric pressure.

The yellow orange dye powder thus obtained dyes wool, silk, leather and particularly cotton, rayon staple and viscose rayon very fast clear yellow shades.

The dyes specified in the following table may be prepared in the same way:

| Example No. | Diazo component | Coupling component | Shade on cotton |
|---|---|---|---|
| 3 | I: 4-NH₂, 1-SO₂H, 3-NHCOCH=CH₂ (benzene) | 1-(2-chloro-5-sulfophenyl)-3-methyl-pyrazolone-(5) | Yellow. |
| 4 | II: 4-NH₂, 3-NHCOCH=CH₂, 1-SO₃H (benzene) | 1-hydroxynaphthalene-5-sulfonic acid | Scarlet. |
| 5 | I | 2-naphthol-6-sulfonic acid (HO₃S—naphthalene—OH) | Scarlet. |
| 6 | II | 2-naphthol-6-sulfonic acid | Orange. |
| 7 | I | 2-naphthol-3,6-disulfonic acid | Scarlet. |
| 8 | II | 2-naphthol-3,6-disulfonic acid | Orange. |
| 9 | I | 1-hydroxy-2-acetylamino-naphthalene-sulfonic acid (OH, NHCOCH₃, SO₃H) | Bluish ruby. |
| 10 | II | 1-hydroxy-2-acetylamino-naphthalene-disulfonic acid | Ruby. |
| 11 | I | 1-hydroxy-2-(β-chloropropionylamino)-naphthalene-disulfonic acid (OH, NHCOCH₂—CH₂Cl, SO₃H) | Bluish ruby. |
| 12 | II | 1-hydroxy-2-(β-chloropropionylamino)-naphthalene-disulfonic acid | Ruby. |

| Example No. | Diazo component | Coupling component | Shade on cotton |
|---|---|---|---|
| 13 | I | ![structure: 1-hydroxy-8-acetamido-3,6-disulfonaphthalene] OH NHCOCH₃ / HO₃S—naphthalene—SO₃H | Ruby. |
| 14 | II | (same as above) | Red. |
| 15 | I | OH NHCOCH=CH₂ / HO₃S—naphthalene—SO₃H | Ruby. |
| 16 | II | (same as above) | Red. |
| 17 | I | NHCOCH₃ / HO₃S—naphthalene—OH | Red. |
| 18 | II | (same as above) | Scarlet. |
| 19 | I | OH / HO₃S—naphthalene—NH₂ | Red. |
| 20 | II | (same as above) | Yellowish red. |
| 21 | I | H₂C—C—CH₃ / O=C   N / N—phenyl—SO₃H (pyrazolone) | Yellow. |
| 22 | II | (same as above) | Yellow. |
| 23 | I | H₂C—C—CH₃ / O=C   N / N—(2-methyl-6-chloro-4-sulfo)phenyl | Yellow. |
| 24 | II | (same as above) | Greenish yellow. |
| 25 | I | H₂C—C—CH₃ / O=C   N / N—phenyl | Reddish yellow. |
| 26 | II | (same as above) | Yellow. |
| 27 | I | H₂C—C—CH₃ / O=C   N / NH | Greenish yellow. |
| 28 | II | (same as above) | Greenish yellow. |
| 29 | I | OH—C₆H₄—CH₃ (p-cresol) | Ochre. |
| 30 | II | (same as above) | Ochre. |
| 31 | I | 2-naphthol | Brown. |
| 32 | II | (same as above) | Brown. |

| Example No. | Diazo component | Coupling component | Shade on cotton |
|---|---|---|---|
| 33 | I | 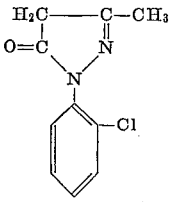 | Yellow. |
| 34 | II | | Greenish. yellow. |
| 35 | 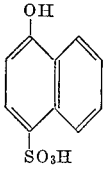 | 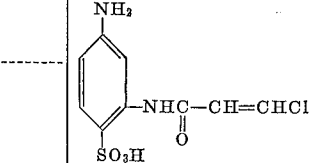 | Red. |
| 36 | 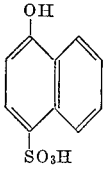 | 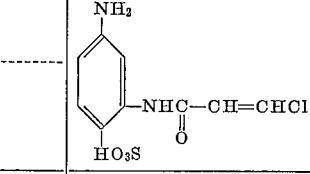 | Ruby. |
| 37 | 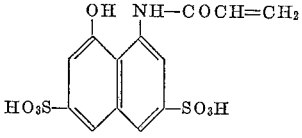 | 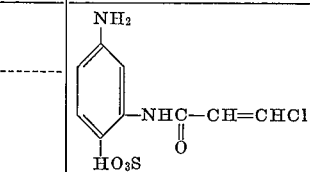 | Yellow. |
| 38 | 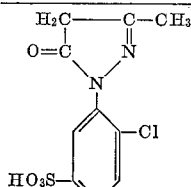 | 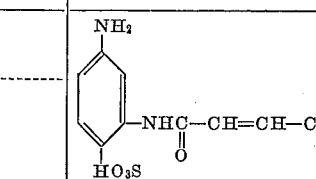 | Red. |

EXAMPLE 39

24.2 parts of 1-amino-4-acryloylaminobenzene-3-sulfonic acid is dissolved in 100 parts of water with the addition of 10 parts of caustic soda solution (10 moles/l.). 20 parts of a 5 M sodium nitrite solution and 200 parts of ice are added to the neutral solution and then 25 parts of hydrochloric acid (10 moles/l.) is poured in.

The hydrochloric acid dispersion of the diazonium salt is neutralized by the slow addition of 10 parts of sodium hydrogen carbonate to a pH which is just acid to congo red. The resultant suspension is then added to 43.9 parts of 1-amino-8-hydroxynaphthalene-3,6-disulfonic acid which has previously been dissolved in 200 parts of water by adding just the necessary amount of sodium carbonate. After stirring for several hours, the intermediate dye has coupled in the range just acid to congo red. The product is salted out with 50 parts of potassium chloride and filtered off with suction. The paste thus obtained is then stirred into 300 parts of water and another diazonium salt suspension prepared as above from 24.2 parts of 1-amino-4-acryloylaminobenzene-3-sulfonic acid is added. A pH value of 8.5 is set up by adding 130 parts of a 1.25 M sodium carbonate solution, the whole stirred for several hours, and the product salted out by adding 40 parts of sodium chloride, filtered off with suction and dried at 60° C. under subatmospheric pressure. A black dye powder is obtained which dyes cotton very fast clear navy blue shades. The two coupling processes may also be carried out in a single stage. The disazo dye is outstandingly suitable for black dyeing when using large amounts of dye.

| Example No. | 1st Diazo component | Coupling component | 2nd Diazo component | Shade on cotton |
|---|---|---|---|---|
| 40 | 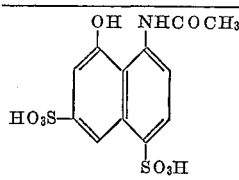 | 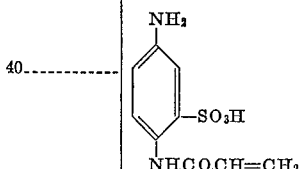 | 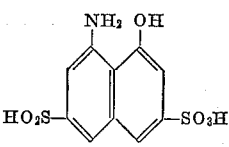 | Navy blue. |

| Example No. | 1st Diazo component | Coupling component | 2nd Diazo component | Shade on cotton |
|---|---|---|---|---|
| 41 | 4-NH$_2$, 2-SO$_3$H, NHCOCH=CH$_2$ phenyl | 1-amino-8-hydroxy-naphthalene-3,6-disulfonic acid (H-acid) | 4-NH$_2$, 2-SO$_3$H, NHCOCH=CH$_2$ phenyl | Navy blue. |
| 42 | 4-NH$_2$, 2-SO$_3$H, NHCOCH$_2$—CH$_2$Cl phenyl | H-acid | 4-NH$_2$, 2-SO$_3$H, NHCOCH$_2$—CH$_2$Cl phenyl | Navy blue. |
| 43 | 4-NH$_2$, 2-SO$_2$H, NHCOCH$_2$—CH$_2$Cl phenyl | H-acid (with SO$_3$H) | 4-NH$_2$, 2-SO$_3$H, NHCOCH=CH$_2$ phenyl | Navy blue. |
| 44 | 4-NH$_2$, 2-SO$_3$H, NHCOCH=CH$_2$ phenyl | H-acid | 4-NH$_2$, 2-SO$_3$H, NHCOCH=CH$_2$ phenyl | Navy blue. |

The dyes shown in the following table may be prepared by the methods described in Examples 1 and 2.

| Example No. | Diazo component | Coupling component | Shade on cotton |
|---|---|---|---|
| 45 | 4-NH$_2$, 2-SO$_3$H, NHCOCH$_2$—CH$_2$Cl phenyl (III) | 1-naphthol-5-sulfonic acid | Red. |
| 46 | III | 1-hydroxy-8-acetylamino-naphthalene-3,6-disulfonic acid | Bluish ruby. |
| 47 | III | 1-(2-chlorophenyl)-3-methyl-5-pyrazolone | Yellow. |
| 48 | III | 1-(2-chloro-4-sulfophenyl)-3-methyl-5-pyrazolone | Yellow. |

| Example No. | Diazo component | Coupling component | Shade on cotton |
|---|---|---|---|
| 49 | II | 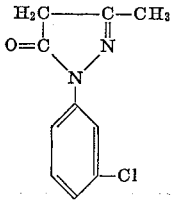 | Yellow. |
| 50 | III | | Yellow. |

Some of the preferred dyes according to this invention are specifically listed below:

*Example 1*

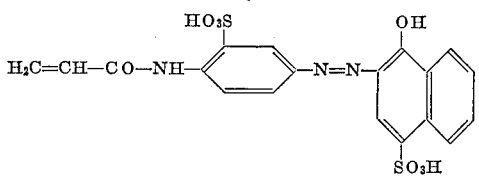

*Example 3*

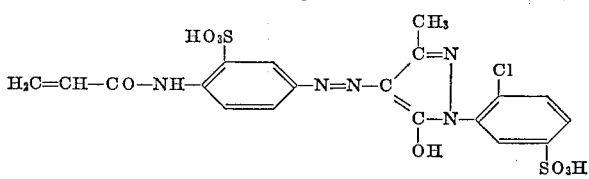

*Example 9*

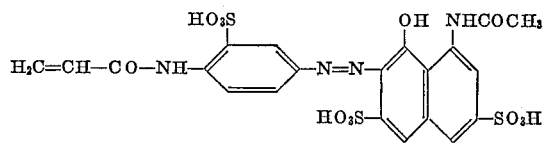

*Example 33*

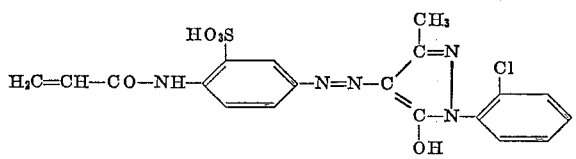

*Example 44*

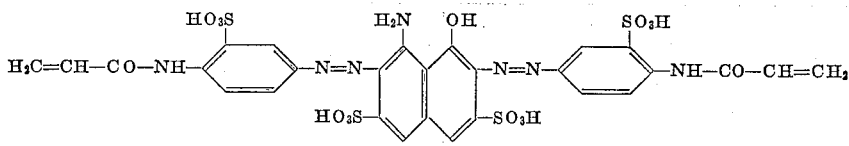

and the corresponding β-chloropropionyl dyes.

I claim:
1. A water-soluble reactive azo dye of the formula

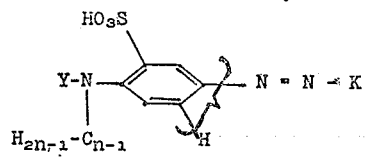

wherein:
Y denotes a reactive acyl radical selected from the group consisting of acrylyl, methacrylyl, chloracrylyl and β-chlorpropionyl;
K denotes a coupling component selected from the group consisting of the hydroxynaphthalene and 3-methyl-porazolone-(5) series; and
n is an integer of from 1 to 3, inclusive.

2. A water-soluble reactive azo dye as claimed in claim 1 wherein at least one sulfonic acid group is attached to an aromatic nucleus of the coupling component.

3. A water-soluble reactive azo dye as claimed in claim 1 wherein K is a hydroxynaphthalene radical substituted by at least one sulfonic acid group and coupled to the radical of the formula

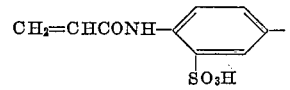

4. A water-soluble reactive azo dye as claimed in claim 1 wherein K is a hydroxynaphthalene radical substituted by at least one sulfonic acid group and coupled to the radical of the formula

5. The dye having the formula:

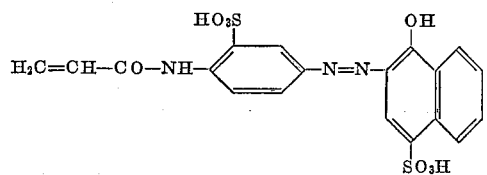

6. The dye having the formula:

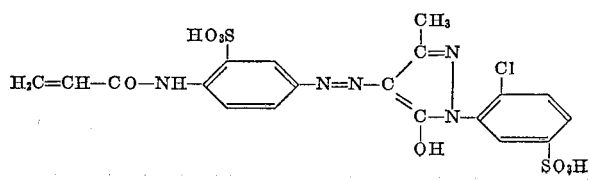

7. The dye having the formula:

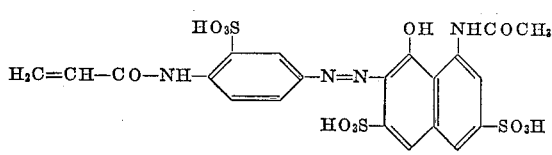

8. The dye having the formula:

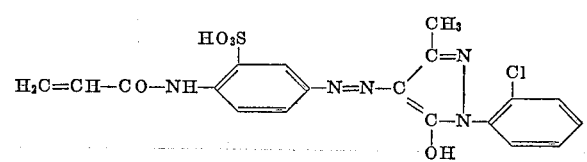

9. The dye having the formula:
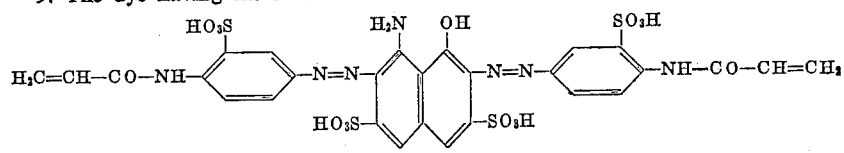
References Cited by the Examiner
UNITED STATES PATENTS
| | | | |
|---|---|---|---|
| 2,374,158 | 4/1945 | Knight et al. | 260—199 |
| 2,931,795 | 4/1960 | Heckendorn et al. | 260—198 X |
| 3,007,762 | 11/1961 | Wegmann et al. | 260—163 X |
FOREIGN PATENTS
| | | |
|---|---|---|
| 565,447 | 9/1958 | Belgium. |
| 565,650 | 9/1958 | Belgium. |
| 1,212,810 | 10/1959 | France. |
| 1,239,052 | 7/1960 | France. |
| 848,742 | 9/1960 | Great Britain. |
CHARLES B. PARKER, *Primary Examiner.*